Patented July 15, 1952

2,603,566

UNITED STATES PATENT OFFICE 2,603,566

SALT COMPOSITION AND METHOD OF PRODUCING THE SAME

Horace W. Diamond, Flossmoor, Ill., assignor to Morton Salt Company, a corporation of Illinois No Drawing. Application September 21, 1950, Serial No. 186,100

6 Claims. (Cl. 99—2)

This invention relates to dietary salt compositions containing trace elements.

The supplementation of animal diets with trace minerals is commonly effected by the addition of such trace mineral salts to common salt used for the feeding of the animals. Among the minerals included as components of such salt compositions are iron and manganese, the iron being usually in the form of either $Fe_2O_3$ or ferrum reductum, and the manganese as a salt, such as manganese carbonate and the like. With respect to the $Fe_2O_3$ or ferrum reductum components of such trace mineralized salt compositions there is considerable question as to whether such iron is nutritionally available since ferrum reductum and $Fe_2O_3$ are difficultly or completely insoluble in synthetic gastric juice. In this connection it is clearly set forth in Pharmacologic Basis for Therapeutics, 1941 Edition, by Goodin and Gilman, that iron in the form of ferrum reductum is insignificantly nutritionally available.

While there are, of course, iron compounds other than the red oxide $Fe_2O_3$ or ferrum reductum which are soluble in dilute acid solutions such as gastric juice, and which would be nutritionally available, they are not generally used due to the fact that such soluble salts have a tendency to leach out of the dietary salt composition, a salt block for example, when subjected to atmospheric exposure.

This is particularly important in the case of salt blocks such as are used for cattle diets. Such blocks may be placed in the open, for access by the cattle, and are unprotected from atmospheric conditions such as dew and rain. Under such conditions, not only is there apt to be a leaching out of many valuable components of the salt block, but even a disintegration of the block itself.

The present invention is based on the discovery that a dietary mineral salt composition comprising common salt in admixture with manganous ferrous phosphate and including trace minerals, not only results in a salt block wherein the manganese and iron are in nutritionally available form, but, in the case of blocks or pellets formed from such mineral salt composition, the said blocks or pellets have superior weathering resistance. Furthermore, I have discovered that salt compositions according to my invention are characterized by the fact that the iron content thereof is insoluble in water and completely soluble in a synthetic gastric juice prepared according to the U. S. Pharmacopeia.

In accordance with my invention salt blocks or pellets are made by admixing common salt and manganous ferrous phosphate as well as other trace elements if desired and then compressing such a mixture in accordance with conventional practice to produce a salt block, pellet or the like. Up to about 0.68 percent of the manganous ferrous phosphate clinker, based on the weight of the block, may be used. Greater amounts than this are not only unnecessary from a nutritional stand point, but are apt to have a tendency to reduce the weather resistance of the block. I have found that the salt block or pellet produced in this manner is almost entirely weather resistant as compared to a similar block wherein the manganese is in the form of, for example, manganese carbonate, and the iron is in the form of iron oxide (red) $Fe_2O_3$ or ferrum reductum.

The manganous ferrous phosphate composition which is an essential component of my improved dietary salt composition is in the form of a homogeneous clinker resulting from the reaction of from about 5 to 11 mols of manganese dioxide and 2 mols of ferrophosphorus. Ferrophosphorous is the name commonly applied to iron phosphides, and the commercial form of the material has a phosphorous content of from about 18 to 27%. The preparation of the aforesaid manganous ferrous phosphate clinker is set forth in the copending application of Willard H. Woodstock, Serial No. 155,779, filed April 13, 1950. As therein disclosed, the manganous ferrous phosphate may be conveniently prepared by the reaction of ferrophosphorus and manganese dioxide, which latter product may be in its native form as pyrolusite. The ferrophosphorus and manganese dioxide which may be in the proportions of 5 to 11 mols of manganese dioxide to 2 mols of ferrophosphorus, are finely ground, intimately mixed and ignited, to form a fused clinker which is then crushed and milled. A satisfactory particle size for purposes of the present invention is −28 mesh to −65 mesh. Finer particle size is less preferable due to the tendency for dusting to occur and because salt blocks containing such finer particles are more susceptible to disintegration than where coarser particle sizes are used. A satisfactory clinker for my purpose may be formed according to the following reaction:

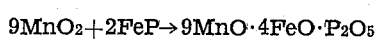

The surprising superiority of my mineral salt composition containing manganous ferrous phosphate, with respect to its resistance to disintegration due to contact with water, and which is reflected in its superior "weathering resistance" is illustrated in the following specific examples.

EXAMPLE 1

Fifteen-gram pellets were prepared under pressures commonly used in preparing commercial 50 lb. salt blocks, with the composition set forth in the table, and the time required for the pellets to disintegrate when immersed in water at 70–80° F. was noted. The following results were obtained:

*Composition of mixture*

| | |
|---|---|
| Salt | 98.7065 |
| Stearic acid | 0.0070 |
| Cobalt carbonate | 0.0262 |
| Copper carbonate | 0.0686 |
| Manganese carbonate | 0.6856 |
| Iron oxide (red) ($Fe_2O_3$) | 0.2969 |
| Potassium iodide | 0.0156 |
| Sodium thiosulfate | 0.0995 |
| Casein | 0.0941 |

Disintegration time: 4 minutes.

EXAMPLE 2

Examples were prepared as in Example I above, but having the following composition:

| | |
|---|---|
| Salt | 98.8834 |
| Stearic acid | 0.0070 |
| Cobalt carbonate | 0.0262 |
| Copper carbonate | 0.0686 |
| Ferro manganese-phosphate clinker (−28 mesh) | 0.6856 |
| Iron oxide (red) ($Fe_2O_3$) | 0.1200 |
| Potassium iodide | 0.0156 |
| Sodium thiosulfate | 0.0995 |
| Casein | 0.0941 |

The disintegration time of pellets having the above composition was 1 hour.

EXAMPLE 3

A salt pellet was prepared having the same composition as Example 2 above except that the particle size of the manganous ferrous phosphate was −65 mesh. The specific disintegration time of such tablets was 15 minutes.

From the above it is seen that the salt composition of the present invention results not only in the formation of a salt block wherein the iron and manganese are in nutritionally available form, but additionally, the block thus produced has superior stability insofar as disintegration resulting from moisture content is concerned, over the blocks wherein the manganese and iron are not in the form of manganous ferrous phosphate. Furthermore, the present material is substantially more economical than those used heretofore and at present.

I claim:

1. A mineral salt composition comprising common salt in admixture with a small amount of the reaction product of ferrophosphorous and manganese dioxide.

2. A mineral salt composition comprising common salt in admixture with a small amount of the comminuted reaction product of ferrophosphorous and manganese dioxide.

3. A mineral salt block comprising common salt in admixture with a small amount of the comminuted reaction product of ferrophosphorous and manganese dioxide, said reaction product having the composition $9MnO \cdot 4FeO \cdot P_2O_5$.

4. A mineral salt block comprising common salt in admixture with about 0.68% of the comminuted reaction product of ferrophosphorous and manganese dioxide.

5. A mineral salt block comprising a mixture of common salt and a small amount of the comminuted reaction product of ferrophosphorous and manganese dioxide, said comminuted reaction product having a particle size of from about −28 mesh to about −65 mesh.

6. A method of making a weather resisting mineral salt block containing a nutritionally available water insoluble manganese and iron component which comprises compressing to block form a mixture comprising common salt and a small amount of the reaction product of ferrophosphorous and manganese dioxide.

HORACE W. DIAMOND.

REFERENCES CITED

The following references are of record in the file of this patent:

UNITED STATES PATENTS

| Number | Name | Date |
|---|---|---|
| 2,489,758 | Dunn et al. | Nov. 29, 1949 |
| 2,489,760 | Dunn et al. | Nov. 29, 1949 |